Figure 1:
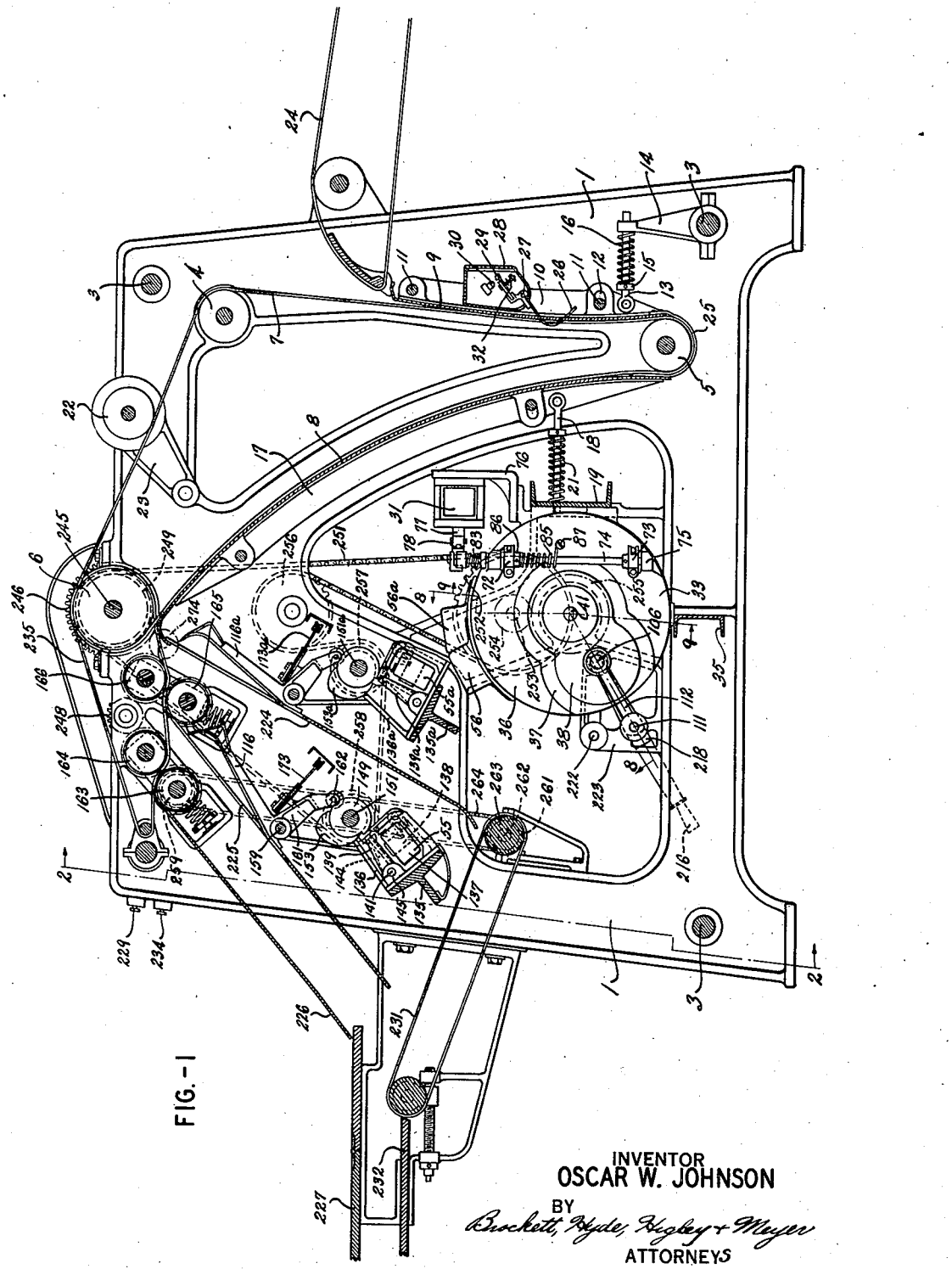

March 17, 1936.  O. W. JOHNSON  2,034,040
FOLDING MACHINE
Filed Nov. 13, 1933    8 Sheets-Sheet 3

INVENTOR
OSCAR W. JOHNSON
BY
Brockett, Hyde, Higley & Meyer
ATTORNEYS

March 17, 1936. O. W. JOHNSON 2,034,040
FOLDING MACHINE
Filed Nov. 13, 1933 8 Sheets-Sheet 4

INVENTOR
OSCAR W. JOHNSON
BY
ATTORNEYS

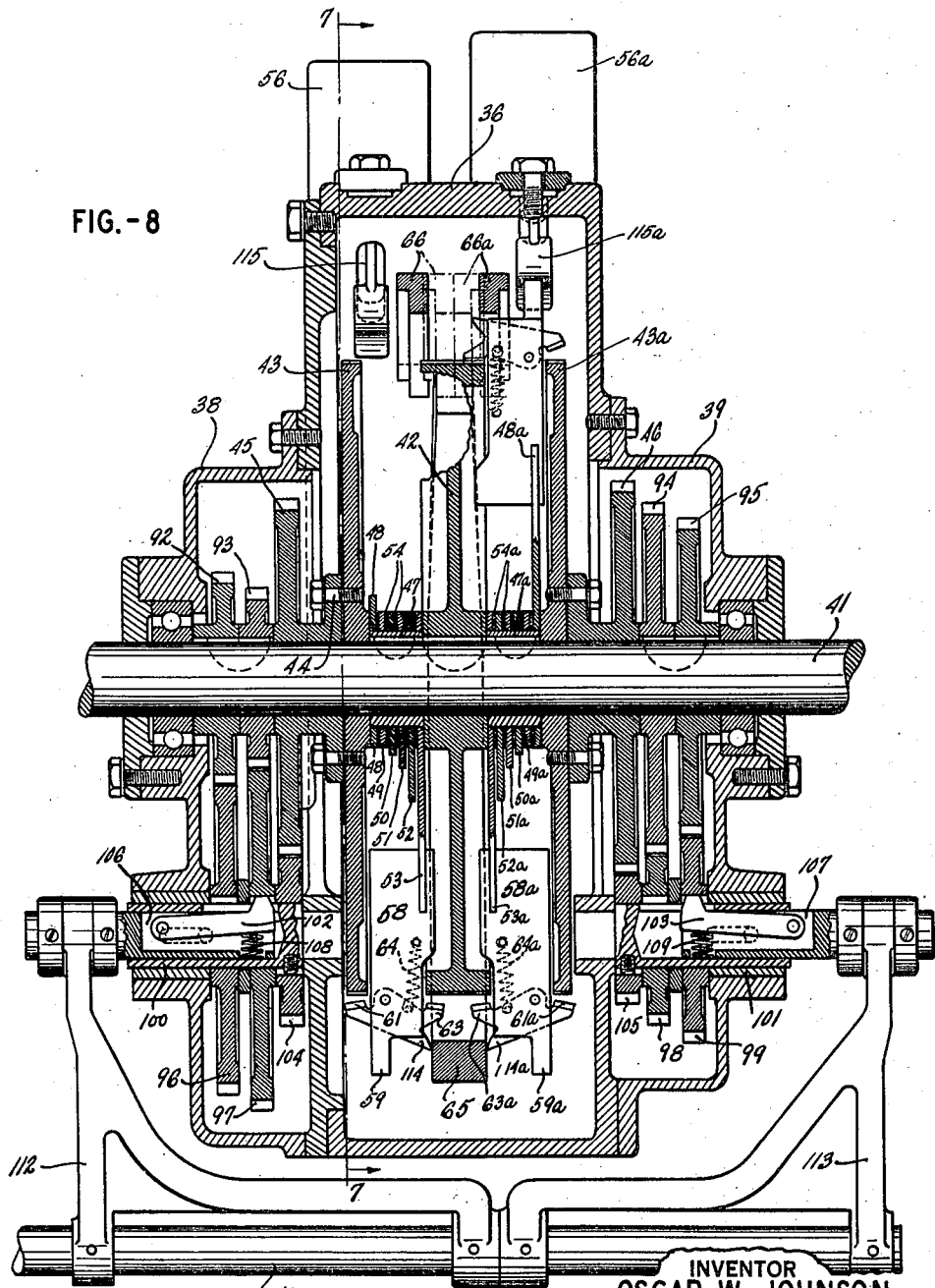

March 17, 1936.   O. W. JOHNSON   2,034,040
FOLDING MACHINE
Filed Nov. 13, 1933   8 Sheets-Sheet 6
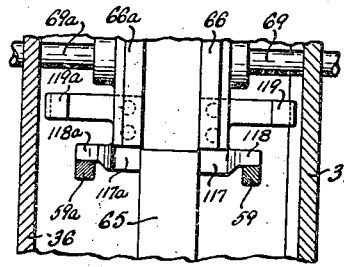
FIG.-17
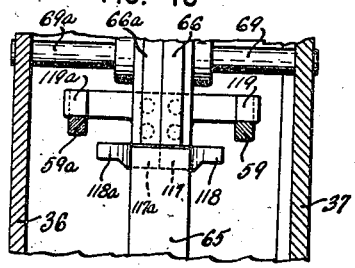
FIG.-18
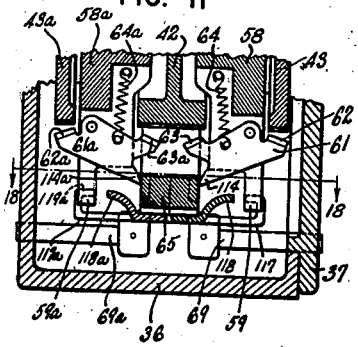
FIG.-11
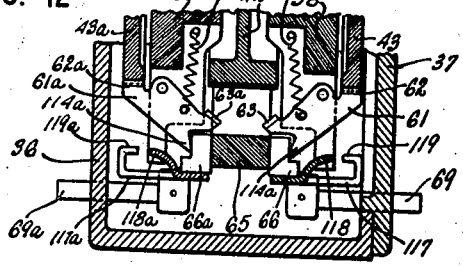
FIG.-12
FIG.-9
INVENTOR
OSCAR W. JOHNSON
BY
Brockett, Hyde, Higley & Meyer
ATTORNEYS

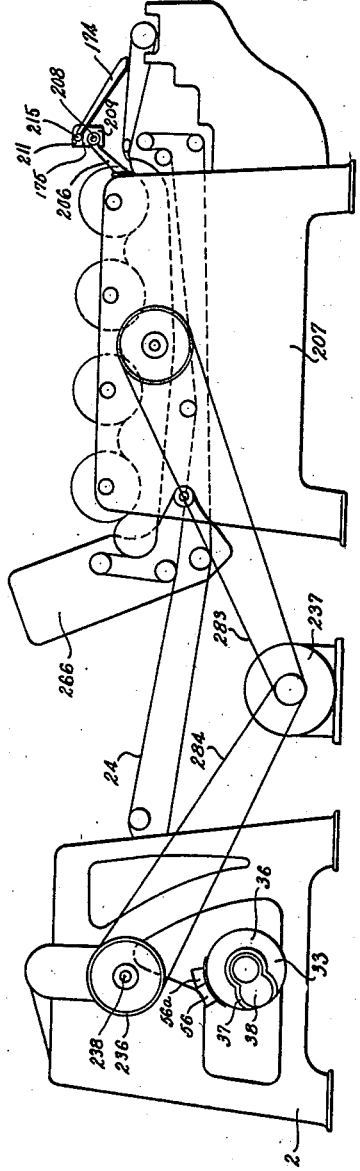

INVENTOR
OSCAR W. JOHNSON
BY
Brackett, Hyde, Higley + Meyer
ATTORNEYS

Patented Mar. 17, 1936

2,034,040

UNITED STATES PATENT OFFICE

2,034,040

FOLDING MACHINE

Oscar W. Johnson, Rochester, N. Y., assignor to The American Laundry Machinery Company, Cincinnati, Ohio, a corporation of Ohio Application November 13, 1933, Serial No. 697,790

26 Claims. (Cl. 270—81)

This invention relates to machines for folding flat articles, such as laundry flatwork, and, more particularly, to machines of this type embodying improved measuring, timing and folding mechanisms, as well as other improvements, the nature of which will appear.

The apparatus comprising the subject matter of the present invention consists, in general, of a framework which supports feed ribbons and platens to direct the work through the machine, a measuring finger which simultaneously selects a plurality of lines of fold, timing mechanism, and folding blades, the operation of which is controlled by the timing mechanism. The apparatus may be arranged to be operated as a separate unit fed by operators standing at the feed end of the machine or it may be arranged to be coupled to an ironing machine so that the articles to be folded are conveyed directly from the ironer to the folding machine. The present invention contemplates an improvement in machines of this type including a novel construction of the several mechanisms going to make up the machine and a novel arrangement of the various mechanisms or parts whereby the folding operation is simplified and the size of the machine may be condensed, its efficiency increased and maintenance charges reduced.

The machine comprises, in outline, a framework, ribbons cooperating with platens mounted in such framework for passing a sheet or other article of flatwork through the machine at a uniform rate of speed, folding blades cooperating with rollers between which the sheet is thrust by the blades in order to effect folding, and means for discharging the folded article from the machine. Timers control the operation of these folding blades and are actuated through the closing and opening of switches by the forward and rearward edges respectively of the article as it passes between ribbons and platens. A plurality of lanes, each controlled by a timer, is provided and articles can be fed through each lane independently for folding, or a wide article can be fed through both lanes, where two are provided, either under control of one timer or of both timers, depending on whether the article is wide enough to actuate both of the switches in the two lanes or is less than two lanes wide but more than one lane wide, and thus does not trip both switches.

The machine is also constructed so that an article passing therethrough can be given no fold, a single fold, or a double fold by the use of but a single timer and switches which disconnect the operating parts of the folding blades selectively so that the article may be shunted past one or more of the folding stations.

The timers for controlling the operation of the folding blades involve a novel construction in various particulars and take into account the varying lengths of articles which may be fed through the folding machine so that the fold always comes in the proper place regardless of the length of the article and so that both a single fold and a double fold or folding in thirds may be timed by the same timer. This is accomplished by arms in the timer which are set to travel at ½, ¼, ⅓, etc., of the speed of the main timer shaft which, in turn, is driven in synchronism with driving means causing the article to travel through the machine. In this way, the arms close switches actuating the folding blades at the proper time and the sheet or other article will be accurately folded when it has reached the folding stations.

The above mentioned arms are caused to commence their travel at ¼ speed or ½ speed, etc., by the tripping of a measuring finger when the forward edge of an article enters the machine, a plurality of lines of fold for a multiple fold article being selected simultaneously, by one finger rather than successively by two fingers as has heretofore been the practice. This is done in accordance with the previous setting of the timer, and this fractional motion is terminated by the opening of the measuring finger switch when the rear edge of the article has passed. The timer arms then continue their travel, but both at the same rate of speed, so that the differential established during the passage of the article past the measuring finger is maintained until the plurality of folding operations has been performed. Among other advantages, this feature results in a shortening of the length of travel of the article with a consequent reduction in the size of the machine and the number of machine parts.

Another feature of the invention is the provision of a safety device in the form of a guard which is raised by the passage of a crumpled or distorted article so as to open a switch, stop the drive, and prevent further passage of the article through the machine.

The invention also contemplates the provision of a folding blade action which brings the blades against the work so as to move the article to the folding rollers at the same speed as the article has previously been moving between the ribbons and platens of the machine. This avoids slippage between the folding blade and the article and prevents distortion and inaccurate folding.

It may also be mentioned as another feature of the new folding machine that only one set of main conveying ribbons is necessary, these cooperating with metal platens to convey the work, thus eliminating the necessity for additional ribbons and complication of the drive for this part of the machine.

It is, accordingly, an object of the present invention to provide a folding machine to which articles can be fed for folding in a plurality of lanes, each lane being operated independently of the others and to which articles of various lengths can be fed in succession and accurately folded regardless of their length. Another object of the invention is to provide a folding machine having a plurality of independently controlled lanes in which an article of any width up to the combined width of the lanes provided may be folded. Still another object of the invention is to provide a folding machine in which the ribbon conveyor means has been greatly simplified. A further object of the invention is to provide a machine in which a plurality of lines of fold may be selected and imparted to an article under the control of one timing mechanism, the plurality of lines of fold being selected simultaneously by one measuring means as the article enters the machine. A still further object of the invention is to provide a machine in which the folding means moves the article to be folded at the same rate that the article is travelling through the machine. An additional object is to provide a machine having safety means for preventing further progress of a crumpled or distorted article and simultaneously stopping the machine. Further objects will in part be obvious and will in part appear hereinafter in connection with the description of the details of the mechanism.

A machine embodying the foregoing advantages consists in outline of conveyor ribbons against which presses a metal platen to conduct a sheet, for example, to the folding stations. This sheet may come from an ironing machine or may be fed in by hand and, at the beginning of its travel, trips a finger or lever as its forward edge reaches a given point. This lever closes a switch which operates a solenoid and plunger to move certain cams in a timer. And these cams, in turn, couple the main shaft of the timer, which is revolving at a constant speed synchronized with the speed of travel of a flat article through the machine, with systems of gears within the timer. Previous to the passage of articles through the machine, gear ratios have been selected within the timer by means of a shifting mechanism so as to give folding in quarters, thirds or whatever folding lines may be desired. The timer is in two sections, one of which may be set to give the first fold and the other the second fold. The selected gears in turn drive a plurality of arms which serve to set the folding blades in operation when the proper points are reached.

The gear ratio selected will drive these arms at ½ the speed or ¼ the speed, etc., of the main shaft of the timer which, as mentioned, is synchronized with the speed of travel of the article through the machine. Thus, the arm travelling at ½ the speed actuates a folding blade when the article is in position for the first fold and the arm travelling at ¼ the speed actuates a second folding blade when the article has reached the station where the double fold is to be effected.

A plurality of arms is supplied on either side of the timer so that articles can be fed through the machine in rapid succession, each pair of arms operating the folding blades for a given article and returning to a storage station upon completion of their action so that there is no lag in the operation of the machine.

The passing of the rear edge of the article to be folded past the switch aforementioned throws the timing arms out of connection with the gears which drive them at differential speeds and into connection with the main shaft so that they travel for the remainder of the distance to the contact points associated with the operation of the folding blades, both at the same rate of speed while preserving the distance between the individual blades of each pair. This subsequent movement is, of course, in synchronism with the speed of travel of the article through the machine, being that which would bring the arm from the starting point to its contact point, if maintained between these points, in the same time that the forward edge of the article travels from the measuring finger to the folding station, and thus preserves the lead which the forward edge of the sheet has gained over the arms during their travel at half speed or quarter speed or other fractional speed. The blade will, therefore, come half way between the forward and rearward edges of the article for the first fold and correspondingly for the second fold due to the distance which it has lost during the interval when the article was passing the measuring finger.

When the aforementioned timing arms reach the proper points along the periphery of the timer, they trip switches which operate magnets which, in turn, release a catch to permit rotation of an eccentric cam which forces the folding blade between two rolls, the action of the cam being gradual so that the blade thrusts the article between the folding rolls at the same rate of speed at which the article is already travelling. This makes for accuracy in folding and avoids distortion. The single folded article then proceeds further through the machine until the second switch on the timer is tripped by the second timing arm and a similar action of the second folding blade takes place to thrust the now single folded sheet through another set of folding rolls to impart the double fold. The contact point for this second timing arm is spaced a greater distance from the starting point to correspond with the position of the second folding station which is at a greater distance from the measuring finger than the first station.

A plurality of lanes may be provided in a single machine, each equipped with a timer for controlling the folding of articles travelling along such lane independently of the operation in the other lanes. Thus, while only two such lanes have been illustrated herein, it will be obvious that the number of such lanes can be further increased by providing a timer for each such lane and appropriate folding mechanism duplicating that to be described. The folding ratios can also be varied, if desired, by changing the gear ratios within the timers.

The machine will also take articles for folding which are wider than one of these lanes, the lever being raised to interlock electrically the electromagnets controlling the folding blades so that they operate simultaneously and the timing of the blades being controlled either by both of the measuring fingers, actuated by the forward and rearward edges of the articles entering the machine, where the article is wide enough to bridge two lanes, or being controlled by only one of the timers where the article is wider than one lane and not as wide as two lanes. The same observations will, of course, apply where more than two lanes are provided in the machine.

Figure 2:
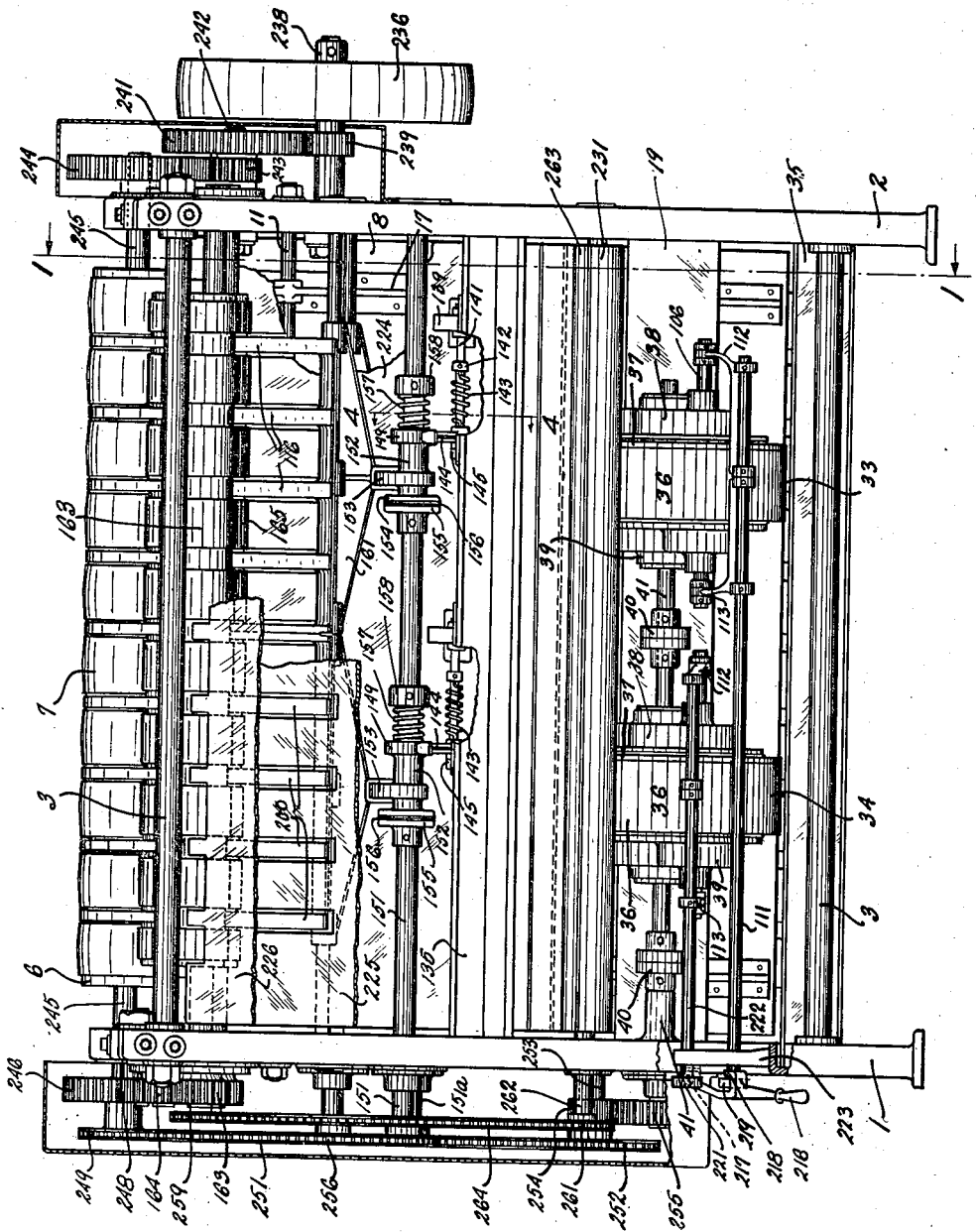
Figure 3:
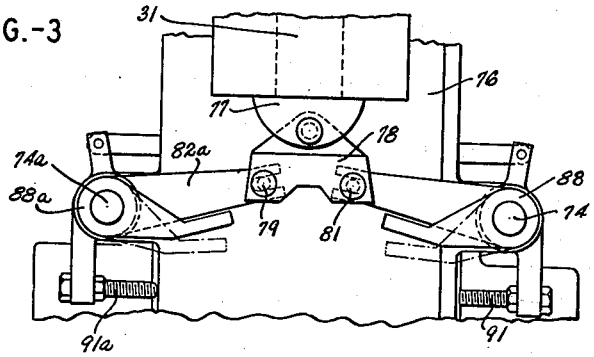
Figure 4:
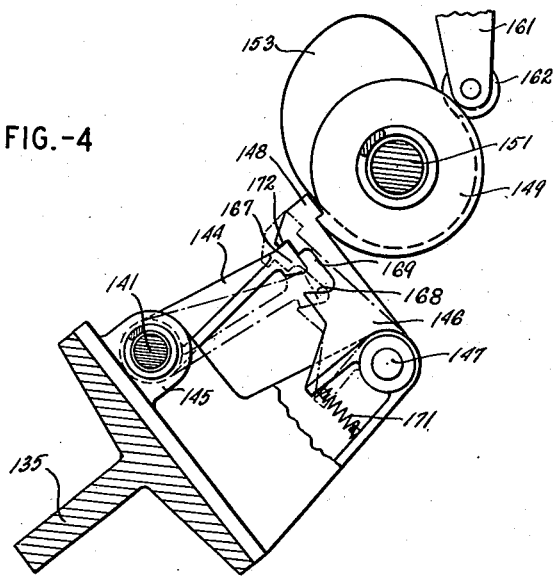
Figure 6:
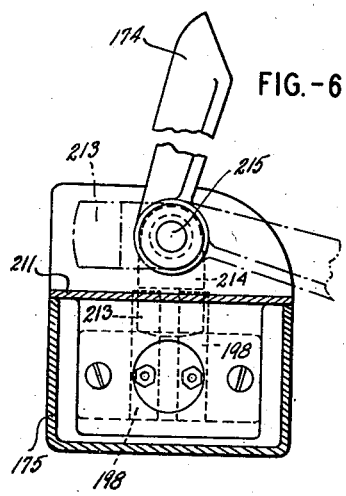
Figure 5:
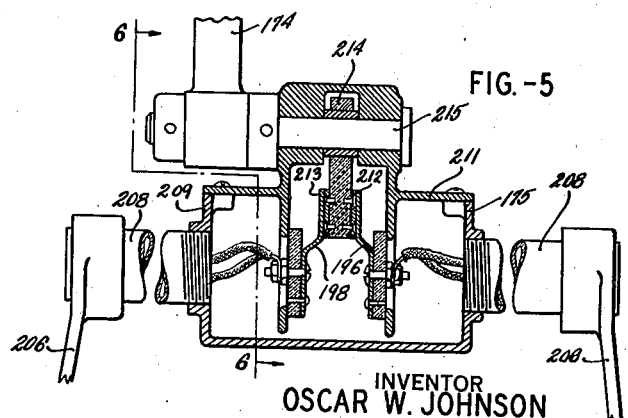
Figure 7:
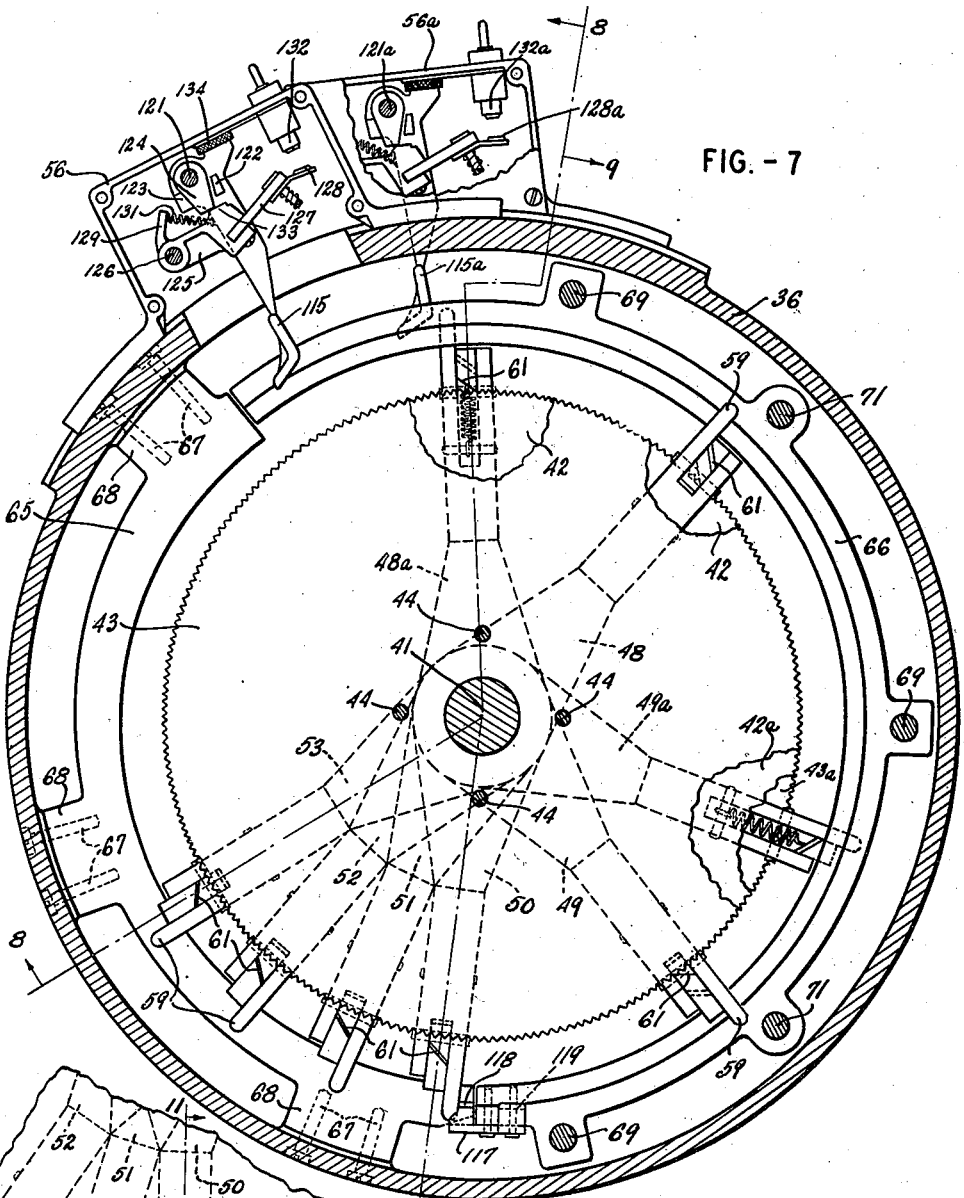
Figure 10:
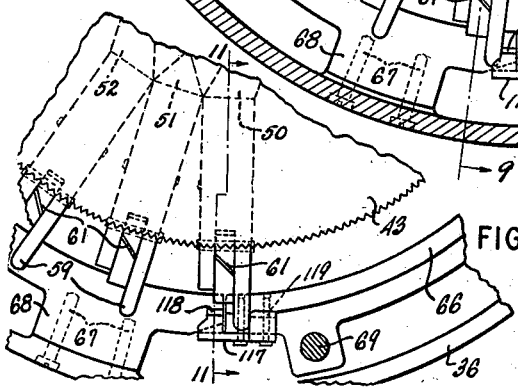
Figure 15:
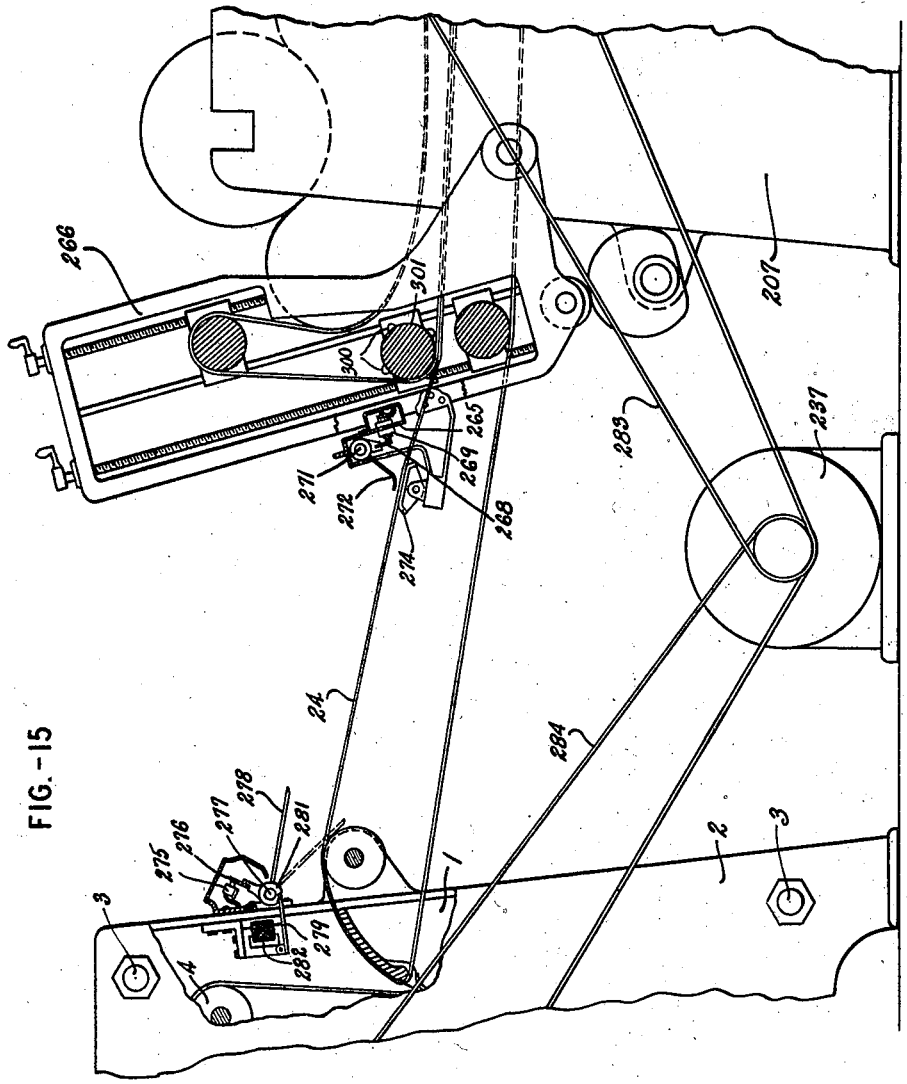
Figure 16:
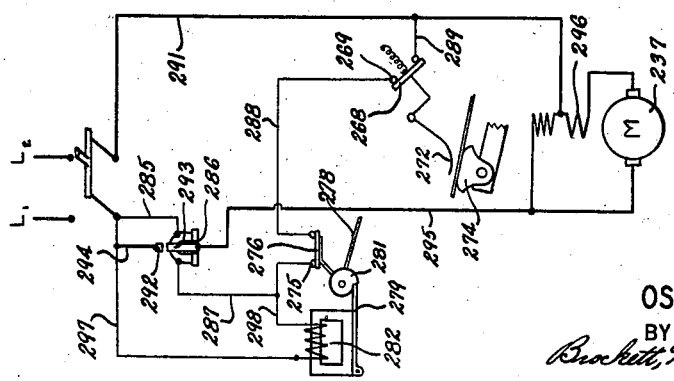

One form of machine embodying the principles set forth above and operating in the manner described is shown in the accompanying drawings, but it will be understood that the same is for purposes of illustration and not of limitation. In said drawings: Fig. 1 is a vertical section through the machine taken along the line 1—1 of Fig. 2; Fig. 2 is a rear elevation taken along the line 2—2 of Fig. 1; Fig. 3 is a fragmentary detail in plan of a solenoid and lever mechanism controlling the operation of cams in one of the timers of the machine; Fig. 4 is a fragmentary detail taken along the line 4—4 of Fig. 2, showing a folding blade operating cam; Fig. 5 is a detail in section of a switch, mounted on the flatwork ironer at the feed end, which controls the interlocking of the folding blades in a multiple station machine; Fig. 6 is a section taken along the line 6—6 of Fig. 5; Fig. 7 is a section through one of the timers taken along the line 7—7 of Fig. 8; Fig. 8 is a section through the timer taken along the line 8—8 of Figs. 1 and 7; Fig. 9 is a section through the timer taken along the line 9—9 of Figs. 1 and 7; Fig. 10 is a fragmentary detail of a part of the timer as shown in Fig. 7 depicting several of the timing arms advanced to another position; Fig. 11 is a section taken along the line 11—11 of Fig. 10; Fig. 12 is a view similar to Fig. 11 showing another step in the operation of the timer; Fig. 13 is a diagrammatic view of the folding machine and a flatwork ironer coupled for cooperative functioning and further illustrating the switch mechanism at the feed end of the ironer for interlocking the timing stages of a multiple stage folding machine; Fig. 14 is a diagram showing the controlling circuit for the machine and means for electrically interlocking several stages of folding blades as illustrated in Fig. 13; Fig. 15 is a fragmentary side elevation of a folding machine and ironer coupled for cooperative functioning and illustrating an arrangement to prevent distorted or crumpled articles from passing into the folding machine; Fig. 16 is a diagram of an electric circuit for the mechanism shown in Fig. 15; Fig. 17 is a fragmentary section of the blade storage mechanism with the timer cams moved apart; and Fig. 18 is a similar view of the storage mechanism with the timer cams moved together.

The particular embodiment of the invention illustrated in the drawings includes end frames 1 and 2 joined together by tie rods 3 to form a framework for the mechanism. Rollers 4, 5 and 6 are mounted in bearings in the framework and are for the purpose of supporting and driving conveyor ribbons 7. There are a plurality of these ribbons across the width of the machine cooperating with metal platens 8 and 9, the ribbons moving the flat articles which are to be folded freely over the platens. The article is fed in between platens and ribbons and is carried along between them for the first part of its travel through the machine before the folding stations are reached.

The mounting for the ribbons and platens consists of brackets 10 supported on rods 11 mounted in the frame. The lower rod 11 passes through an elongated slot 12 in the bracket 10 so that the bracket is free to move around the upper rod 11 as a pivot. Bolts 13 are connected to the brackets 10 and are adapted to engage slidably in an aperture in brackets 14 mounted on the tie rods 3. Each of the bolts 13 is provided with a collar 15 and a spring 16 which abuts the collar and bears against one of the stationary brackets 14. The brackets 10 support the smooth-surfaced platen 9 extending the full width of the machine, this platen engaging the travelling ribbons 7 and being mounted in resilient contact therewith by the action of the bolts 13 held against the platen by the spring 16. Another set of brackets 17, mounted in the same manner as brackets 10, support the other smooth-surfaced platen, which engages the moving ribbons 7 subsequent to the first platen 9. The mounting for this bracket, which holds the platen 8 resiliently against the ribbons, consists of bolts 18 connected to the brackets 17 and a channel 19 mounted on the frame of the machine. A spring 21 urges the platen yieldingly against the ribbons. The purpose of the resilient mounting of the platens is to compensate for varying thicknesses of material and to maintain sufficient contact between the platens and the ribbons to cause the article to move freely over such platens. In other words, the platens take the place of two sets of ribbons. It should also be pointed out that the ribbons 7 are maintained in the necessary taut position by means of an idler roller 22 mounted in the frame on swinging bearing brackets 23. The weight of the idler roller resting on the surface of the ribbons keeps these taut.

The ribbons 7 are driven by means of the rollers 6 and work placed on the feed belt 24 is carried between the belts and the platens 8 and 9 until it reaches the folding stations. Curved steel ribbons 25 are placed around the lower half of the roller 5, being secured at one end to the outside face of platen 9 and at the other end extending upwardly between the platen 8 and the ribbons 7. These steel ribbons provide means for conveying the articles around the roller 5 between the lower ends of the two platens. As the flat article passes between the ribbons 7 and the platen 9, it contacts with a measuring finger 26 pivoted at 27 in a switch box 28. The measuring finger extends between the ribbons and through a slot in the platen 9 so as to be pushed outwardly around the pivot 27, bringing another arm 29 into electrical contact with a contact point 30. This completes an electrical circuit through a solenoid 31 which sets a timer in motion to control the folding operation. When the rear edge of the article has passed the measuring finger, the tension of a spring 32 breaks the contact.

*Timing mechanism*

The machine herein described is equipped with two timers 33 and 34 supported in position on channels 19 and 35 which connect the end frames. Each timer, whether one or two or more are used, is of essentially the same construction and a description of one will suffice for all. The timer includes a housing 36 enclosed on one side by a cover 37 which carries a smaller housing 38 enclosing a transmission for one-half of the timing mechanism. Another smaller housing 39 on the opposite side of the timer encloses the other half of the timing mechanism.

As illustrated in Figs. 7, 8, and 9, the timing mechanism comprises a main shaft 41, provided with couplings 40, to which is keyed a central serrated ratchet wheel 42. To the left of the serrated ratchet wheel 42, see Fig. 8, is positioned another ratchet wheel 43 secured by means of bolts 44 to the hub of a gear 45. To the right of the ratchet wheel 42 is another serrated ratchet wheel 43a secured in like manner to the hub of a gear 46. Collars 47 and 47a are keyed to the main shaft 41 on either side of the hub of the ratchet wheel 42 and between it and the ratchet wheels 43 and 43a.

These collars support for rotation about the main shaft 41, a series of timing arms 48, 49, 50, 51, 52 and 53, on one side of the ratchet wheel 42 and a similar series of timing arms 48a, 49a, 50a, 51a, 52a and 53a, on the other side of the ratchet wheel. Spring discs 54 and 54a are mounted on the collars 47 and 47a between each of the timing arms for the purpose of providing sufficient friction between the arms so that, when they are disconnected from the other mechanism of the timer upon completion of the initiation of a folding operation, they may be rotated around to a starting position or storage station, as illustrated by the group of four arms clustered together in Fig. 7.

The timing arms are identical in construction but the group of six on the left side of the timer is reversely positioned to the group of six on the right side of the timer. The group on the left in Fig. 8 controls the operation of an electro-magnet 55 through a switch 56 mounted on top of the timer. The group on the right controls the operation of another electromagnet 55a through another switch 56a also mounted on top of the timer. Since the timing arms are identical in structure a description of the construction of but one will be given.

In Fig. 9, is shown the construction of right and left arms 50 and 50a in section. The timing arm 50 comprises a member 57 to which is secured a slotted member 58. This member 58 is provided with a finger 59 which is intended to engage a depending arm of the switch 56 previously mentioned. A pawl 61 is pivotally supported within the slot in member 58 and is provided at one end with a tooth 62 and at the other end with a tooth 63. The pawl 61 is adapted to turn about its pivot so as to bring the tooth 62 into engagement with the serrated edge of the ratchet wheel 43 at certain times and to bring the tooth 63 into engagement with the serrated edge of the ratchet wheel 42 at other times. Since the pawl is pivoted in the timing arm 50, it will be seen that selective engagement of the pawl with either of the ratchet wheels mentioned will impart the rotation of one or the other of the ratchet wheels to the timing arm. The arm is thus driven in synchronism with the article conveying means through ratchet wheel 42 and at a fractional speed by the wheel 43. A coil spring 64 is provided to maintain the pawl normally in engagement with the ratchet wheel 42.

The construction of the corresponding arm 50a is identical with that of 50 with the exception that the position of the parts is reversed. Thus, to engage the tooth 63 of the pawl 61 with the ratchet wheel 42, the pawl rotates clockwise, whereas to engage the tooth 63a of the other pawl with the same ratchet wheel, the pawl must rotate counterclockwise.

In order to move the pawls 61 and 61a into and out of engagement with the ratchet wheels, some means must be provided which will do this in a properly timed manner. This function, among others, is performed by a cam 65 and associated cams 66 and 66a. Cam 65, Figs. 7, 8, and 9, is secured to the housing 36 of the timer and diametrically opposed to this cam are the two cams 66 and 66a, movable with respect to the housing. The cam 65 and the cams 66 and 66a complete a circle within the housing having, as they do, an arcuate shape. The cam 65 is rectangular in section, tapering along its length, and is secured to the timer housing by bolts 67 threaded into bosses 68 on the cam.

The cam 66 is L-shaped in section and is mounted on pins 69, Figs. 7 and 9, which are adapted to slide in apertures in the housing cover 37. The cam is also provided with pins 71 which extend through apertures in the cover 37 and are pivotally connected to levers 72 and 73 pinned to a vertical shaft 74 mounted in bosses 75 on the cover 37. This shaft 74 is adapted to be rotated a certain amount to move the cam 66 from the position shown in dotted lines (Fig. 8) to the position shown in full lines by means which will be described hereinafter. As will be apparent, rotation of the shaft 74 imparts lateral movement to the cam 66 through the levers 72 and 73 acting on the pins 71.

The cam 66a, which moves oppositely to the cam 66, is similarly supported by pins 69a and is provided with pins 71a which extend through apertures in the housing 37 and are pivotally connected to the levers 72a and 73a pinned to the shaft 74a. Similarly to shaft 74, this shaft 74a is adapted to be rotated a certain amount to move the cam 66a from the dotted line position to the full line position, as shown in Fig. 8. The two described mechanisms for producing side movement of these cams are interconnected and simultaneously actuated as follows:

Referring to Figs. 1, 3 and 9, the solenoid 31, previously mentioned as being actuated by the opening and closing of the switch operated by the movement of the forward and rear edges of an article to be folded past the measuring finger 26, is mounted on a bracket 76. The plunger 77 of the solenoid is connected to a bifurcated member 78, provided with pins 79 and 81. These engage in the slotted ends of levers 82 and 82a and these levers are, in turn, connected to the shafts 74 and 74a. This connection is through coil springs 83 and 83a, one end of each, as shown in Fig. 9, being secured to one of the levers 82 and 82a and the ends being secured in collars 84 and 84a pinned to the shafts 74 and 74a respectively. Another set of coil springs 85 and 85a surround the shafts 74 and 74a respectively, one end of each of these springs being secured in each of the collars 86 and 86a surrounds the shafts 74 and 74a. The other ends of these last mentioned coil springs are secured to the housing of the timer, as shown in Fig. 1, by screws 87. An additional set of levers 88 and 88a is provided adjacent the levers 82 and 82a. These levers are pinned to the shafts 74 and 74a respectively and each has a depending extension 89 and 89a lying in the line of movement of the levers 82 and 82a. The function of this portion of the mechanism is as follows: When the solenoid plunger 77 is moved inwardly to the position shown in Fig. 3 by the closing of the measuring switch by the forward edge of a flat article entering the machine, the lever 82 is rotated clockwise and the lever 82a is rotated counterclockwise. The springs 83 and 83a are sufficiently stiff, under normal operating conditions, to rotate the shafts 74 and 74a respectively to move the cams 66 and 66a to their outer position shown in full lines Figs. 8 and 9. As mentioned, the rotation of the vertical shafts 74 and 74a causes lateral movement of these cams through the levers 73 and 73a, the levers being attached to laterally extending pins 71 passing through apertures in the ends of the timer housing.

The turning of the shafts 74 and 74a stores energy in the springs 85 and 85a, one end of each spring being attached to the timer housing and the other end to one of the two shafts and, when the coil of the solenoid 31 is de-energized by the opening of the measuring switch as the rear edge of the flat article passes the measuring finger, the springs 85 and 85a restore the shafts and the cams 66 and 66a to their former positions. In other words, these springs execute the reverse movement of the parts, the force of the spring being communicated to the levers 82 and 82a through the levers 88 and 88a with their depending extensions lying in the path of the first-named levers.

The purpose of interposing springs in the linkage between the cams and the solenoid is to prevent damage to the mechanism where an abnormal operating condition is met, such as where resistance is offered to the full movement outwardly of the cams. In such circumstances, the solenoid plunger continues to its closing position, as before, but the shafts 74 and 74a will not be forced to rotate, the lost motion being taken up by the coil springs 83 and 83a. Briefly, these springs are rigid enough to rotate the vertical shaft under normal conditions but are not rigid enough to rotate them against increased resistance offered by jamming of the parts. An example of such an abnormal operating condition is that which exists when a pawl tooth 63 or 63a does not completely engage in the serrated edge of the ratchet wheel. In such case, to force it into engagement would damage the pawl or the ratchet wheel, or both, but, with a mechanism arranged as above whereby the force exerted is resilient, the movement of the parts will be delayed until the tooth has properly engaged in the ratchet wheel. During such period of abnormal operation, the levers 88 and 88a will remain in some intermediate position in their rotation, such as that illustrated in dotted lines in Fig. 3, and, when the abnormal condition has corrected itself, these levers will snap into the position shown by full lines so that normal operation may be resumed.

Adjusting means to regulate the movement of the cams 66 and 66a are provided in the form of set screws 91 and 91a. These set screws regulate the distance through which the levers 82 and 82a can travel, a slight clearance being left between depending extensions 89 and 89a and the levers 82 and 82a when the mechanism is set for proper movement of the cams 66 and 66a. When the solenoid is de-energized, the action of the springs 85 and 85a in returning the mechanism to its normal position, is assisted by the springs 83 and 83a which tend to hold the levers 82 and 82a against the depending extensions of the levers 88 and 88a.

The foregoing describes the manner in which a timer is set in operation by the passage of a sheet, for example, through the folding apparatus. The functioning of the timer once it has been set in operation will now be described. Referring to Fig. 8 of the drawings, gears 92, 93, 94 and 95 are keyed to the drive shaft 41 of the timer, the gears being of different dimensions. Meshing with these gears respectively are other gears 96, 97, 98 and 99 rotatably mounted on sleeve shafts 100 and 101. These last named gears are provided with keyways into which may be inserted keys 102 and 103, on either side of the timer. While the gears 96, 97, 98 and 99 are not permanently fixed to the sleeve shafts 100 and 101, other gears 104 and 105 are pinned permanently to this sleeve shaft and mesh with gears 45 and 46 respectively rotatably mounted on the main timer shaft 41. These last named gears are bolted to ratchet wheels 43 and 43a respectively so as to turn with these ratchet wheels.

When it is desired to rotate the sleeve shafts 100 and 101, the keys 102 and 103 fit into the keyways of one of the gears 96, 97, 98, 99 on each side of the timer and thus lock the selected gear to the sleeve shaft and turn the same. The keys are pivotally mounted in slidable shafts 106 and 107 respectively and are normally maintained in the keyways of the gears by springs 108 and 109. Now, for the purpose of illustration, let it be supposed that the machine is to be operated to fold an article in a double fold; a shifting mechanism including a shaft 111 and brackets 112 and 113 secured to the adjustable shafts 106 and 107, is moved to the right so that key 102 engages in the keyway of gear 97 and the key 103 engages in the keyway of gear 99. With this setting, the gear 93, turning with the main shaft 41, meshes with the gear 97 to turn the sleeve shaft 101, to which the latter gear is locked by the key 102. This sleeve shaft in turn drives the gear 104 which is pinned to the sleeve shaft and the gear 104, meshing with the gear 45, drives this latter and the ratchet wheel 43 attached thereto at ¼ the speed of the main timer shaft 41 and in the same direction. This speed differential is, of course, determined by the gear ratio. On the other side of the timer case, the gear 95 meshing with the gear 99 drives the sleeve shaft 101 which, in turn, drives the gear 105 meshing with the gear 46 rotatably mounted on the main shaft 41. The rotation of the gear 46 is communicated to the ratchet wheel 43a, causing the latter to rotate in the same direction as the main shaft but at ½ the speed. Here again the speed differential is determined by the gear ratio. With the setting just described, the ratchet wheel 43a will be the driving medium to select the single fold for the flat article and the ratchet wheel 43 will be the driving medium to select the double fold.

When it is desired to operate the machine to fold an article in a ⅓ fold, the shifting mechanism is moved to the left (Fig. 8) so that the key 102 engages in the keyway of gear 96 and the key 103 engages in the keyway of gear 98. With this setting, the ratchet wheel 43 is driven through gears 92, 96, 104 and 45 and the ratchet wheel rotates in the same direction as shaft 41 at ⅓ the speed. The ratchet wheel 43a will be driven through gears 94, 98, 105 and 46 and the wheel will rotate in the same direction as the main shaft at ⅔ the speed of such shaft. In this way as many folding ratios may be selected as there are gear ratios within a given timer and the folding ratios may be changed, if desired, by changing the gear ratios supplied in a given timer.

Means for imparting differential speeds with respect to the timer shaft 41 and the two ratchet wheels 43 and 43a have now been described. These differential speeds of the ratchet wheels are previously selected and will be maintained until another setting is made by the operator. Means must next be provided for communicating these differential movements to the timer arms previously mentioned. When a flat article is passed through the machine, the front edge thereof contacts with the measuring finger 26 and energizes the solenoid coil 31, as mentioned. The motion of the solenoid coil is transmitted to shafts 74 and 74a which, in turn, move the cams 66 and 66a outwardly toward the ends of the timer casing to engage the extensions 114 and 114a of the pawls 61 and 61a, as seen in Fig. 12. This swings the pawls about their pivots to bring the teeth 62 and 62a into engagement with the teeth of the ratchet wheels 43 and 43a, respectively.

The pawls now constitute direct connections between the ratchet wheels and the timing arms to which they are attached, for example, arms 50 and 50a. These arms will, therefore, begin rotation counterclockwise, as shown in Fig. 7, at the same rate of speed as that at which the ratchet wheel is rotating. If this be ½ the speed of the main timer shaft, the arm will advance at ½ speed, and so on.

This differential rotation of the timing arms will continue until the rear edge of the article to be folded passes the measuring finger 26 whereupon the measuring finger springs back into place and opens the circuit through the solenoid coil 31. The springs 85 and 85a then reverse the movement of the parts and cause the cams 66 and 66a to move back to their normal position, that is the cams close together. This permits the pawls, under the pull of the springs 64, to rotate past the cams so that the other teeth 63 and 63a of the pawl engage with the teeth of the ratchet wheel 42, as shown by Fig. 9 in connection with timing arm 50a. The ratchet wheel 42 is fixed to the main shaft 41 and always rotates at the same speed as such shaft. The timing arms have now ceased to be driven by the ratchet wheels 43 and 43a but are driven, instead, by the ratchet wheel 42.

If it is desired to fold an article in a double fold and the timer gears have been correspondingly set, the timing arm 50a which has been in engagement with the ratchet wheel 43a, has been moved at ½ the speed of the timer shaft 41 and the timing arm 50, which has been in engagement with the ratchet wheel 43, has been moved at ¼ the speed of the driving shaft 41. Thus the timing arm 50a has advanced twice as far as the timing arm 50. Now, when the pawls engage with the ratchet wheel 42, as above described, both timing arms cease to be driven at different speeds and move at the same speed as the shaft 41 while maintaining the distance between them which was determined by the previous differential speeds. In other words, during the first part of the movement when they were in engagement with the ratchet wheels 43 and 43a, the two arms were moving at different speeds relative to each other but when both of the pawls engage the same ratchet wheel 42, the two arms continue their movement but at the same speed as the driving shaft.

As they continue in their course, the arm 50a engages the depending lever 115a of switch 56a which closes the circuit to electro-magnet 55a, causing operation of folding blade 116a. At this time, the center line of the article to be folded has reached a point where it will be engaged by the folding blade 116a since the article has gone ahead of the timer arm during the one-half speed period of the arm's travel a distance equal to one-half the length of the article. When this contact has been made, the arm 50a continues its movement, as does the arm 50, and the arm 50 then engages another depending lever 115 of the switch 56. A circuit is thus made through electro-magnet 55 to cause operation of the folding blade 116. At this time, the article has been moved into a position where the center line of the now single-folded article is engaged by the folding blade 116 for the second folding operation, coincidence of the center line of the article and of the second blade being brought about by the lag resulting from the quarter speed of the arm 50.

The two timing arms which control the double folding of a given flat article have now completed their function and it is desired to return them to the starting point so that they may be used to control the folding of another article. The arms continue to rotate, being still driven by the ratchet wheel 42, until they reach the cam 65. This cam is narrow where it abuts the cams 66 and 66a so that its side edges coincide with the side edges of the latter when these are in closed position, as may be seen in Figs. 8 and 11. The cam 65 thus engages the extensions 114 and 114a of the pawls 61 and 61a. The cam is also eccentric, broadening out as it approaches the starting point for the timer arms, so that it picks up the pawls and, as the timing arms continue their rotation, the increasing width of the cam, as shown in Fig. 8, moves the pawls out of engagement with the ratchet wheel 42 into a neutral position where they do not engage with any of the ratchet wheels. In this neutral position, the frictional contact set up by the friction rings 54 causes continued movement of the arms until they are stopped by members 117 and 117a, as shown in Figs. 7 and 9. Since a plurality of sets of timing arms, six sets in the present instance, are provided, articles can be fed in close succession, each set of arms controlling the folding of one article and a plurality of sets being in motion at the same time. All of these come to rest, when they have performed their function, against the members 117 and 117a and this position may, therefore, be termed a storage station. The arms are stored only so long as they are not needed to time a folding operation and are immediately available for further use.

This utilization of the timing arms is brought about by the following mechanism: If it be assumed that the arms 50 and 50a have just left the storage station and are still in engagement with ratchet wheels 43 and 43a, then when the rear edge of the article which they are timing has passed the measuring finger 25, the cams 66 and 66a are moved to closed position and the teeth of the pawls on these timing arms engage with the ratchet wheel 42. At the same time, the members 117 and 117a will move inwardly with these cams and fingers 118 and 118a will free the arms and allow them to move forward to engage fingers 119 and 119a, as shown in Figs. 10 and 11. Now, when the front edge of another article engages the measuring finger 26, the cams 66 and 66a are again caused to move to the outer position, and the fingers 119 and 119a, moving with these cams, free the arms 50 and 50a and they begin a second rotation to time the folding operation of this article. Likewise, the other timing arms move forward and are stopped by the fingers 118 and 118a to await another operation.

Folding blade mechanism

These timing arms actuate the folding blades through switches 56 and 56a mounted on the timer housing. The two switches are identical in construction so that a description of one will suffice for both. The lever 115, with which the timing arm contacts, is pivotally supported on shaft 121 within the switch casing and is provided with lugs 122 and 123 extending out from the face of the lever. These lugs are adapted to engage the sides of a latch 124 which is also free to pivot about the shaft 121. A bell crank lever 125 is pivoted on a shaft 126 in the switch housing and carries at one end a contact arm 127 supporting contact finger 128. The other arm 129 of the bell crank lever retains a coil spring 131 which engages the lever 115. The function of this mechanism is to make and break quickly a circuit between the contact finger 128 and contact posts 132, the circuit thus closed and opened including electro-magnet 55 which sets the folding blade 116 in operation.

The operation of the switch is as follows: A timer arm engaging the lever 115 rotates the same clockwise and lug 122 is brought against the latch 124 and moves it off the boss 133 of the lever 125. As the latch clears the boss, the coil spring 131 causes instant rotation of the lever 125 and brings the points 128 and 132 quickly into contact. This provides the circuit which energizes the coils of the electro-magnet controlling the folding blade operation. As the timing arm moves past the lever 115 and releases it, the compression under which the spring 131 has been placed by the rotation of the lever 115 as the timing arm continues to press against this lever, forces the lever back and the other lug 123 engages the latch 124, forcing the latter into engagement with the boss 133 which has a sloping face. This results in rapid rotation of lever 125 in a clockwise direction to break the contact between the points 128 and 132. The lever 115 is limited as to its movement in a counterclockwise direction by the bumper 134.

As mentioned, the timer switch 56 controls the operation of the folding blade 116 and the timer switch 56a, of the same construction, controls the operation of the folding blade 116a. The mechanism set in operation by the switches to control the operation of the blades is identical and, accordingly, only one of these mechanisms need be described.

As shown in Figs. 1, 2 and 4, the mechanism associated with switch 56 is supported on angle iron 135 and the mechanism associated with switch 56a is supported by angle iron 135a, brackets 136 and 136a being mounted on the respective angle irons. The mechanism actuated by switch 56 comprises a magnet coil 137, a core 138, and an armature 139. This armature is pivotally mounted on a shaft 141 which also has fixed to it a collar 142, see Fig. 2. In this collar is secured one end of a coil spring 143, the other end of the coil spring being secured in the hub of a lever 144 which is rotatably mounted on the shaft 141.

Referring now to Fig. 4, a bracket 145 supports the left end of the shaft 141, and also pivotally supports another lever 146, pivoted in the bracket on pin 147 so as to swing perpendicularly to the lever 144 and coacting therewith. This lever 146 is provided with an extension 148 which is adapted to engage in the notch of a latching disk 149. This latching disk is mounted on shaft 151 lying parallel to shaft 141 and carrying folding blade 116. The purpose of the described mechanism is to control the application of power to the folding blade from the constantly rotating shaft 151 by means of the magnet 55.

The member 152 on the shaft 151 includes the latching disk 149, a cam 153 and one element 154 of a clutch, all of these parts being rotatable about the shaft 151. The other element 155 of the clutch is pinned to the shaft. The clutch elements are provided with clutch facing material 156 and are maintained in contact by a coil spring 157 and a collar 158 pinned to the shaft. The shaft 151 rotates continuously and, as long as the lever 146 engages the notch in the latching disk 149, the latching disk and cam are held against rotation with the shaft on which they are mounted, the faces of the clutch plates slipping past each other. If, now, the magnet coil 55 is energized through the action of the timing arms in the timer 33, the armature 139 is attracted and caused to rotate clockwise, this motion, through the spring 143, causing the lever 144 also to be rotated clockwise, thus releasing the lever 146 from the notch in the latching disk 149. The constantly rotating shaft 151 can now rotate the cam 153 through the clutch elements 154 and 155. Since the folding blade 116 is provided with an arm which intersects the path of the cam, the cam will now move the blade into engagement with an article to be folded.

The folding blade 116 is pivotally mounted at 159 and has an arm 161 carrying a roller 162 which rides on the surface of the cam 153. The clockwise rotation of the cam will, therefore, raise the arm 161 and rotate the folding blade counterclockwise to move the flat article into engagement with folding rolls 163 and 164. One complete revolution of the cam accomplishes the desired movement of the blade and, when one revolution has been completed, the lever 146, will again engage the notch on the disk 149 and stop the rotation of the cam. The shaft 151, however, continues its rotation in readiness for a subsequent operation. The operation of the folding blade 116a is brought about in the same manner but it is actuated prior to the blade 116 and thrusts the article between folding rolls 165 and 166.

The interaction of the levers 144 and 146 is important in the operation of this portion of the apparatus and will be particularly pointed out in connection with Fig. 4. The lever 144 is provided with a head 167 of such a shape as to engage with the inclined face 168 of a slot 169 in the lower side of the lever 146. This face is so inclined that the cooperating face of the head 167 causes the lever 144 to exert a downward pull on the lever 146 and quickly move the extension 148 out of engagement with the notch in the disk 149. The disk and cam 153 are now free to rotate with the shaft 151. Since the arm 50 quickly makes and breaks contact in the switch 56, controlling the operation of the magnet 55, the lever 144 is immediately freed by the armature 138 and exerts no further pull on the lever 146. Accordingly, the spring 171 moves the lever 146 back against the edge of the disk 149. When the disk and cam have rotated one revolution the extension 148 will again engage the notch in the disk and stop further rotation. The lever 144, which has moved back when released by the magnet, will engage in a shoulder 172 provided in the lever 146 to prevent the latter from slipping out of engagement with the notch in the disk 149. The folding blade is moved gradually into engagement with the article to be folded as the cam 153 gradually lifts the arm 161, the outline of the cam being so chosen, the cam shaft rotating in synchronism with the main drive, that this movement of the blade coincides with the travel of the article through the machine so that there is no distortion of the article and misalignment of the fold. To insure a steady, even movement of the blades, the final movement thereof is slightly and resiliently resisted by small leaf springs 173 and 173a, illustrated in Fig. 1.

Setting and operation

The machine is equipped for multiple stage operation, a two-stage machine being illustrated in the drawings requiring two sets of timers, two sets of folding blades, and two sets of switches for operating these devices. Small articles may thus be fed through the machine in the different lanes, controlled each by its own timer, without having to align the pieces transversely of the machine and each will be folded in the ratio for which its timer is set. This is best illustrated in Fig. 14, which is a wiring diagram of the timer circuit. Tracing the diagram first, for individual operation of the sets of blades, the switch 174 is in the open position, as shown in diagram. The circuit for operation of the timer 33, controlling folding blades 116 and 116a, is then as follows: From L1 through line 177, through measuring switch 28, through solenoid coil 31, through line 178 to L2. This circuit, which was established by engagement of the front edge of the article to be folded with the measuring switch, energizes the solenoid coil causing operation of the timer arms within the timer, as previously described, and when these have rotated around to operate the levers 115 and 115a, a circuit is established from L1, through line 179, through switch 56a, through line 181, electro-magnet coil 55a, through line 182 to L2. This causes operation of the first folding blade 116a.

The circuit for the other folding blade is from L1, through line 183, switch 56, line 184, electro-magnet coil 55, and thence to L2. This causes operation of the second folding blade 116.

The circuit is similar for the other stage, passing from L1, through line 185, measuring switch 186, through line 187, solenoid coil 188 and line 189 to L2. This measuring circuit then closes the folding circuit as follows: From L1 through line 191, switch 192a, line 193, through electro-magnet coil 176a to L2. Likewise, the other folding circuit is closed from L1, through line 194, switch 192, line 195, electro-magnet coil 176 to L2. Thus, separate and individual operation for each stage is brought about.

Where the article is two lanes wide, it will engage the measuring finger for each lane and both timers will operate to control the operation of both stages of the folding blades. Simultaneous operation of the two stages of blades thus occurs without special attention.

If it should be desired, however, to feed an article which is wider than one lane but not wide enough to engage each of the measuring fingers in the two lanes, folding may be brought about by means of a lever 174 which, in the two-stage machine, is at the center of the flatwork ironer from which articles are fed. In such case, the operator raises the lever 174, Figs. 5, 6 and 13, which operates switch 175 to connect electrically the electro-magnets 55 and 55a and 176 and 176a, so that both sets of folding blades will be controlled by one of the timers. This is brought about by raising the lever to connect electrical contacts 196 and 197 together, and contacts 198 and 199 together. Supposing now that the wider article engages only the measuring finger 28 but is wide enough so that both sets of folding blades 116 and 116a, and 200 and 200a are required. In such case, the circuit is from L1, through line 177, measuring switch 28, line 201, solenoid coil 31 and line 178 to L2. The solenoid is thereupon energized to cause operation of the timer arms within the timer and these, in turn, close the switches 56 and 56a to complete a circuit from L1, through line 179, switch 56a, line 181, through electro-magnet coil 55a and line 182 to L2; and simultaneously from line 181, through line 202, across contacts 196 and 197, through line 203, through line 193, and through electro-magnet coil 176a to L2. This operates both folding blades 116a and 200a. At the same time, a circuit is established from L1, through line 183, switch 56, line 184, through electro-magnet coil 55, to L2; and simultaneously from line 184, through line 204, across contacts 198 and 199, through line 205 to line 195, and through electro-magnet coil 176 to L2. These circuits operate folding blades 116 and 200.

With the foregoing arrangement, if the articles are small and can be accommodated by the individual lanes, they are passed through these lanes and folded without relation to the operation of the other lane. If the article is wide enough to engage measuring fingers in both lanes, both timers are simultaneously operated to cause the folding blades of both stages to operate together. Lastly, if the article is of intermediate width, the lever 174 is raised and both stages of folding blades are controlled through one measuring finger by one timer.

The construction of the switch 175 operated by the lever 174 may be seen in Figs. 5 and 6. The switch is supported on brackets 206 mounted on the frame of the flatwork ironer 207 illustrated in Fig. 13. The brackets carry tubes 208 which directly support the switch housing 209, having a cover 211 supporting the two sets of contact fingers, fingers 196 and 197 being on one side and fingers 198 and 199 being on the other side. In the operation of the switch by the lever 174, these contacts are connected by segments 212 and 213 respectively, the segments being carried by a lever 214 of insulating material. The lever is pivotally mounted on a shaft 215 mounted in the cover 211, the lever 174 being connected to this shaft, as shown. By throwing the lever 174, it will be seen that the contact points may be connected through the segments 212 and 213 mounted on the shaft 215, which is rotated by such lever, and the circuits described above for folding an article of intermediate width will be established.

It has been previously pointed out that the timers contain a plurality of gears by which various gear ratios can be established in order to drive the timing arms at various differential speeds in order to fold the article in quarter folds, one-third folds, etc. Selection of the required gear ratios for the desired fold is accomplished for any one stage by the lever 216, see Fig. 2. This lever is pivotally and rotatably supported on the end frame 2 at 217. It is provided with a lug 218 which fits around a collar 219 on the shifting shaft 111.

As previously mentioned in connection with Fig. 8, this shaft 111 moves the keys 102 and 103 to select and connect the desired gears in driving relation with the timing arms. By pulling laterally on the lever 216, the keys can be moved back and forth to select any of the available gears and thus give different folding conditions, such as a quarter or a one-third fold. Similarly, if it is also desired to change the folding ratio of the other timer 34, the lever 216 is swung around its pivot so that the lug 218 engages around the collar 221 of another shifting shaft 222 connected to the timer 34. The bracket 223 carries two of these shifting shafts, one for each timer, but these may be supplemented by additional shafts where three stages or more are provided in the folding machine.

In the operation of the machine, the article is fed either by hand or by machine between the ribbons 7 and the platen 9 and moves along until its forward edge engages the measuring finger 26. When this occurs, a circuit is completed through solenoid 31 which causes a pair of arms in the timer to commence rotation at speeds previously determined by the setting effected through the above described shifting mechanism.

When the rear edge of the article passes the measuring switch, the solenoid releases the timing mechanism and the timing arms, which have now selected the folding lanes for the article, continue their movement, but at a rate synchronized with, or proportional to, the speed of travel of the article between ribbons and platen. The article travels between ribbon 7 and platen 8 until it reaches platen 224, over which it moves. Where a double fold is to be imparted, the timer actuates folding blade 116a at the moment when the center of the article registers with the blade. This coordination is brought about by synchronizing the drive of the timer shaft with the drive of the feed ribbons. When the first timing arm of the pair which has been set in motion by the tripping of the measuring finger, closes its switch, the folding blade 116a is moved toward folding rolls 165 and 166 by cam 153a at a speed which is synchronized with the speed of movement of the article itself, due to the fact that the cam shaft is also driven in synchronism with the drive of the feed ribbons. The single-folded article is thrust between the folding rolls by the blade and passes downwardly over a platen 225. When the center line of the now single-folded article is opposite the blade 116, this blade is similarly moved toward the folding rollers 163 and 164. The article passes between this second set of rollers and is delivered over a platen 226 to a table 227. As the articles to be folded in accordance with the above described mode of operation are inserted between the folding rolls by the folding blades, a small set of ribbons 235 are provided to maintain the normal direction of movement of the folded article passing through the rollers.

If it should be desired to cut out the second folding operation, during which the article is passed between rollers 163 and 164, switches 228 and 229, shown in Figs. 1 and 14, may be opened. Where this is done, the article in a single-folded condition passes over platen 225 to a belt 231 and thence to a table 232. If it is desired to omit both folding operations, then the switches 228, 229, 233 and 234 are opened and the article passes unfolded over the platen 224 to the belt 231 and thence to the table 232. Articles can thus be fed through the machine in rapid succession in two or more lanes at the same time, the articles in one lane being fed without regard to the articles in the other lane, and the timers being able to time the folding of a constant succession of articles without delay, because of the plurality of timing arms provided and the storage means for making these arms available.

*Drive*

The drive for this machine is shown in Figs. 1 and 2 and is as follows: The pulley 236 is connected by a belt to a motor 237 (Fig. 15) and is mounted on a shaft 238. Motion is thus transmitted to a gear 239 which meshes with a gear 241 on a shaft 242. On this shaft is mounted another gear 243 meshing with a gear 244 on shaft 245. This latter shaft supports the ribbon drive roll 6. On the other end of this shaft, a gear 246 meshes with an idler gear 247 which, in turn, meshes with a folding roll gear 166 (see Fig. 1), and folding roll gear 166 meshes with folding roll gear 165. Another idler 248 is provided which meshes with folding roll gear 166 and with folding roll gear 164. Folding roll gear 164 then meshes with folding roll gear 163 and thus the drive from the motor to the folding rolls and to the feed ribbons is completed.

The drive for the timers and for the cams 153 and 153a, controlling the operation of the folding blades, is synchronized with the drive for the feed ribbons and the folding rolls. This drive includes the shaft 245 which also carries a sprocket 249 over which runs a chain 251 to drive a sprocket 252 on shaft 253. A gear 254 on shaft 253 meshes with a gear 255 on timer shaft 41. The chain 251 passes over an idler 256, around sprockets 257 and 258 and thence back to the sprocket 249. Sprockets 257 and 258 are mounted on the shafts 151a and 151, respectively, which control the operation of the cams 153a and 153. Since the chain 251 is driven from the same shaft which mounts the ribbon drive roll 6, it will be seen that the timers, driven through their respective shafts, and the cams which operate the folding blades, will be driven in synchronism with or in proportion to the feed mechanism.

In order to drive the belt 231, the same being for the purpose of delivering articles which have not passed through both folding rolls, as mentioned, a sprocket 259 is provided on the shaft of the folding roller 163, this sprocket driving the sprocket 261 on the shaft 262 of the roller 263 by means of a chain 264.

From the above, it will be apparent that a complete and comparatively simple drive from one source of power has been provided to produce synchronous movement of all operating parts.

The foregoing describes the normal operation of the machine when no abnormal conditions are encountered. However, it will sometimes be the case that a distorted or partially crumpled article may be encountered. In Fig. 15 of the drawings, is shown in fragmentary diagrammatic form, a flatwork ironer and a folding machine coupled together. The work passes from the flatwork ironer over the feed belt 24 and under the apron 299, being prevented from following the apron back through the ironer by four quarter-oval iron strips 300 riveted to the roll 301 around which the apron passes. This construction acts as a shaker which frees the flatwork from the upper apron and overcomes any tendency for the work to follow this apron around the roll. The conveying means between the ironer and the folding machine is provided with an arrangement whereby distortion of an article in passage from the flatwork ironer to the folding machine is called to the attention of the operator. This arrangement comprises a switch 265 mounted on the apron brackets 266 of the flatwork ironer 207. The switch includes two contactors 268 and 269, as indicated in Fig. 16. Contactor 269 is stationary and contactor 268 is pivotally supported on a shaft 271. Directly connected to the movable contactor 268 is a guard 272. The guard, in normal operation, is adapted to lie close to the delivery ribbons 24 and is backed up by a pivotally supported table 274. In normal operation, the contactors 268 and 269 are closed, as shown in Fig. 15. On the folding machine, another switch, including contactors 275 and 276, is mounted. Contactor 276 is rotatably mounted on a shaft 277 and is provided with a series of arms 278. These arms are normally in the upper position, as shown in full lines, and are held in such position by a latch 279 which engages a notch in the arm support 281. The latch 279 is held in the latching position, as shown, by an electro-magnet 282.

The flatwork ironer 207 and the folding machine, as shown in Fig. 15, are driven by the same motor 237, of compound type, which is belted to the machines by belts 283 and 284 respectively. The above described switches are connected in the circuit to this motor, and control its operation when abnormal conditions are encountered.

Such a condition may be brought about when an article, emerging from the flatwork ironer, becomes rumpled or distorted in any manner so that it projects far enough above the ribbon 24 to engage the guard 272 and rotate it clockwise. This rotation separates the contactors 268 and 269 which breaks the circuit to the solenoid coil of the electro-magnet 282 and the latch 279 drops down and permits the arms 278 to engage between the ribbons, as shown in dotted lines. These arms are thus in position to prevent the crumpled article from proceeding into the folding machine. Simultaneously, this movement of the arms opens contactors 275 and 276 which breaks the circuit to the motor and stops the machine. When this happens, the operator must go to the point of trouble and there straighten out the distorted article so as to allow the guard 272 to drop again and reestablish the circuit at the contactors 268 and 269. When this has been done, the operator must also raise the arms 278 to bring the contactors 275 and 276 into closed position before the motor circuit is completed.

The circuits controlled by these mechanisms is illustrated in Fig. 16 wherein, during normal operation, the connection is established from L1 through line 285, through the coil of magnetic switch 286, line 287, across contactors 275 and 276, through line 288, across contactors 268 and 269, through line 289 and line 291 to L2. This circuit energizes the coil of magnetic switch 286, closing contactors 292 and 293 of this switch, and a circuit is established from L1, through line 294, through contactors 292 and 293, line 295, the armature of the motor and the series field 296 thereof to L2.

Another circuit is provided which is controlled by the movement of the guard 272. This circuit runs from L1, through line 297, through the coil of electro-magnet 282, line 298, across contactors 275 and 276, through line 288, contactors 268 and 269, and through lines 289 and 291 to L2. If this circuit is interrupted at 268 and 269 by movement upwardly of the guard 272 when a crumpled article comes through, the coil of the magnetic contactor switch 286 is deenergized and the contactors 292 and 293 are separated, opening the circuit to the motor and stopping both the flatwork ironer and the folding machine, which are driven by the same motor. At the same time, the circuit through the coil of the electro-magnet 282 is also opened, which permits the latch 279 to drop down and free the shaft 277 which opens contacts 275 and 276 and drops the arms 278. This circuit, as well as the circuit of the magnetic switch 286, is maintained open until the operator comes and raises the arms 278 which restore the circuit through contactors 275 and 276. The operator also straightens out the rumpled article so that guard 272 drops down and brings contactors 268 and 269 into contact again. This restores the other circuit and the machine is again ready to operate.

A plurality of electrical safeguards are thus provided, but, even if the motor should continue to operate under such abnormal conditions, or articles should continue to be fed, the arms 278, occupying the position shown in dotted lines in Fig. 15, prevent the passage of a distorted article into the folding machine.

What I claim is:

1. In a folding machine, folding means, means for conveying a foldable article into position to be acted on by said folding means, means for actuating said folding means when the article is in position to be folded, and means actuated by the article during its passage through the machine for simultaneously selecting a plurality of lines of fold.

2. A folding machine comprising means for conveying a foldable article therethrough, means for imparting a fold to said article, means for selecting a plurality of lines of fold simultaneously, and timing means actuated by said selecting means for controlling the operation of said folding means.

3. A folding machine comprising a plurality of lanes, means for conveying foldable articles in said lanes, means for imparting a fold to the articles in each lane, means in each lane for measuring said articles and selecting a plurality of lines of fold simultaneously, and timing means actuated by said measuring means for controlling the operation of said folding means independently of each lane.

4. A folding machine comprising a plurality of lanes, means for conveying foldable articles in said lanes, means for imparting a fold to the articles in each lane, one measuring means in each lane for selecting simultaneously a plurality of lines of fold for each article, and one timing means in each lane for controlling the operation of the corresponding folding means.

5. A folding machine comprising means for conveying a foldable article therethrough, a plurality of folding means for imparting a plurality of folds to said article, means for selecting a plurality of lines of fold simultaneously, and a means actuated by said selecting means for controlling the operation of all of said folding means.

6. A folding machine comprising means for conveying a foldable article therethrough, two folding blades, a measuring finger actuated by the forward and rear edges of the travelling article for selecting two lines of fold simultaneously, and a timer actuated by said measuring finger for controlling the operation of both of said folding blades.

7. A folding machine comprising a plurality of lanes through which articles to be folded are conveyed, conveying means in said lanes, a common drive for said conveying means, folding blades in each lane, and a single means for controlling the folding blades in each lane independently of the folding blades in the other lanes.

8. A folding machine comprising a plurality of lanes through which articles to be folded are conveyed, conveying means in said lanes, a common drive for said conveying means, folding means in each lane, single controlling means for the folding means of each lane, whereby the folding of articles in each lane is independent of the folding operations in the other lanes, and means for placing the folding means in a plurality of lanes under the control of one of said single controlling means.

9. In a folding machine adapted to impart a plurality of folds to a foldable article, a timing means including, timing arms for timing said folds, driving means for rotating said arms at various speeds, and shifting means on said timing means for selectively engaging any of said driving means in driving relation to said arms.

10. In a folding machine adapted to impart a plurality of folds to a foldable article, a timing means including, timing arms for timing said folds, gear trains for rotating said arms at various speeds from a common shaft, and shifting means for selectively engaging any of said gear trains in driving relation to said arms.

11. In a folding machine adapted to impart a plurality of folds to a foldable article and having means for conveying said articles therethrough, a timer controlling the folding of the article including, a rotatable shaft synchronized with the drive for said conveying means, a rotatable member driven directly from said shaft and other rotatable members driven at different rates of speed indirectly from said shaft, timing arms in said timer, and means for selectively driving said arms through said directly driven member or through said indirectly driven members.

12. In a folding machine adapted to impart a plurality of folds to a foldable article and having means for conveying said articles therethrough, a timer controlling the folding of the article including, a casing, a set of timing arms on each side of said timer, the arms of one set controlling one folding operation and the arms of the other set controlling a subsequent folding operation on the same article, rotatable members in said casing, and a pair of cams, simultaneously operable to engage a timing arm in each set with said rotatable members.

13. In a folding machine adapted to impart a plurality of folds to a foldable article and having means for conveying said articles therethrough, a timer controlling the folding of the article including, a rotatable shaft synchronized with the drive for said conveying means, a ratchet wheel driven directly from said shaft, other ratchet wheels driven from said shaft through any one of different sets of reduction gearing, timing arms in said timer, and cam means in said timer for selectively driving said arms through said directly driven ratchet wheel or individually through a plurality of said other ratchet wheels.

14. In a folding machine adapted to impart a plurality of folds to a foldable article including means for conveying articles through the machine, a timing means comprising, timing arms for timing said folds, driving means for rotating said arms at fractions of the speed at which said articles are conveyed, and shifting means for selectively engaging any of said driving means in driving relation to said arms.

15. In a folding machine adapted to impart a plurality of folds to a foldable article including means for conveying articles through the machine at a constant rate of speed, a timer comprising timing arms for timing said folds, a set of driving means for rotating said arms at one-half and one-fourth, and another set of driving means for rotating said arms at one-third and two-thirds, of the speed of said conveying arms, and shifting means for selectively engaging either set of driving means in driving relation to a pair of said arms.

16. In a folding machine adapted to impart a plurality of folds to a foldable article and having means for conveying said articles therethrough, a timer controlling the folding of the article including, a rotatable shaft synchronized with the drive for said conveying means, a ratchet wheel driven directly from said shaft, other ratchet wheels driven from said shaft through any one of different sets of reduction gearing, timing arms in said timer, cam means in said timer for selectively driving said arms through said directly driven ratchet wheel or individually through a plurality of said other ratchet wheels, and shifting means for selectively engaging any of said different sets of reduction gearing in driving relation to said arms.

17. In a folding machine adapted to impart a plurality of folds to a foldable article, means for conveying the article through the machine, measuring means for selecting the lines of fold, timing means actuated by said measuring means for controlling all of the folding operations, a plurality of cam means in said timing means, each of said cam means effecting the establishment of one line of fold, and a solenoid excited by said measuring means for operating all of said cam means.

18. In a folding machine adapted to impart a fold to a foldable article, timing means including a timing arm and a switch actuated by said arm for initiating the folding operation, contact points in said switch, a lever in said switch engageable by said timing arm, a spring connected to said lever and one of said contact points adapted to throw said contact points together, and a latch cooperating with said spring to separate said points when said timing arm has released said lever.

19. In a folding machine including a timer, a switch on said timer cooperating with a timer arm, a pivotally mounted lever in said switch engageable by said timer arm, another pivotally mounted lever connected to said first-named lever by a spiral spring, a contact point on said other lever and a cooperating contact point on the switch housing, a latch on said first-named lever engageable with a boss on said other lever, and lugs on said first-named lever adapted to engage said latch to move the same off and onto said boss, said spring cooperating with said latch and boss to make and break a circuit through said contact points.

20. In a folding machine, the combination which comprises conveying ribbons and pivoted platens directly cooperating with said ribbons to convey a flat, foldable article through the machine.

21. In a folding machine, the combination which comprises conveying ribbons and metal platens resiliently pressed against said ribbons for conveying a flat, foldable article through the machine.

22. A folding machine comprising means for conveying a foldable article through the machine, a folding blade, and means for moving said folding blade in engagement with said article at the same speed as said conveying means, such movement of said blade being of uniform character.

23. A folding machine comprising means for conveying a foldable article through the machine, a folding blade, a shaft connected for rotation in synchronism with the drive for said conveying means, and a cam on said shaft operatively engaging said blade, whereby the movement of said blade into engagement with such an article is of uniform character and at the same speed of said conveying means.

24. A folding machine comprising means for conveying a foldable article through the machine, a folding blade, a shaft connected for rotation in synchronism with the drive for said conveying means, a cam on said shaft, a cam-engaging arm on said folding blade, and a cam surface on said cam adapted to lift said blade in a uniform manner and at the same speed as the foldable article is travelling through the machine.

25. In a folding machine, a drive motor, delivery means for conveying flat articles to said machine, means pivotally mounted above said delivery means, a switch in the circuit to said motor operable by said pivoted means, said pivoted means being movable by the passage of a crumpled article to open said switch, blades releasably held above said delivery means, and another circuit controlled by said first-named circuit, said blades being released by the opening of the other circuit to drop into the path of the crumpled article.

26. In a folding machine, a drive motor, delivery ribbons for conveying flat articles to said machine, means pivotally mounted above said ribbons and providing sufficient clearance for a flat article, contactors in the circuit to said motor, an arm on said pivoted means adapted to bridge said contacts, said pivoted means being movable by the passage of a crumpled article to disconnect said contacts, blades releasably held above said delivery ribbons, an electro-magnet holding said blades in such position and a magnetic switch in circuit with said contactors, said switch being operable by the raising of said pivoted means to open another circuit to said electro-magnet releasing said blades to intercept the passage of a crumpled article.

OSCAR W. JOHNSON.